United States Patent [19]
Minamizawa et al.

[11] Patent Number: 5,933,947
[45] Date of Patent: *Aug. 10, 1999

[54] METALLIZED FILM PROCESS FOR PRODUCTION THEREOF

[75] Inventors: Kiyokazu Minamizawa; Yutaka Motokawa; Masaharu Fukushima; Tadatomo Nakao, all of Kakogawa; Iwao Matsuoka, Kako-Gun; Toshiyuki Yanagida, Kakogawa, all of Japan

[73] Assignee: Kakogawa Plastics Co., Ltd., Kakogawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,399

[22] Filed: Jul. 7, 1997

Related U.S. Application Data

[63] Continuation of application No. 08/524,445, Sep. 6, 1995, abandoned.

[30] Foreign Application Priority Data

Mar. 20, 1995 [JP] Japan .................................. 7-085940
Mar. 20, 1995 [JP] Japan .................................. 7-085941

[51] Int. Cl.⁶ .................................................. H05K 3/02
[52] U.S. Cl. .......................... 29/847; 29/846; 29/25.42; 29/25.41; 361/274.1; 361/301.5
[58] Field of Search .............................. 361/275.1, 275.2, 361/275.3, 275.4, 273, 274.1, 301.5, 306.1, 530, 513, 305, 307, 309–312; 29/25.42, 846, 847, 25.41

[56] References Cited

U.S. PATENT DOCUMENTS

| | | | |
|---|---|---|---|
| 2,216,559 | 10/1940 | Ortlieb et al. | 361/273 |
| 4,494,168 | 1/1985 | Kume et al. | 361/273 |
| 5,136,462 | 8/1992 | Steiner | 361/273 |

*Primary Examiner*—Leo P. Picard
*Assistant Examiner*—Phuong T. Vu
*Attorney, Agent, or Firm*—Wenderoth, Lind & Ponack, L.L.P.

[57] ABSTRACT

A metallized film suitable for providing a self-preservative metallized film capacitor is prepared. A metallized stock film strip is provided which includes a dielectric film strip and a plurality of deposited metal segments formed thereon so that the deposited metal segments are generally separated from each other but with an electrical connection extending therebetween. The electrical connection is then removed by a short circuit energy or a subsequent slitting. As a result, a metallized film having metal segments deposited on a dielectric film strip can be produced efficiently while avoiding winding wrinkles and a lowering of the process speed.

3 Claims, 8 Drawing Sheets

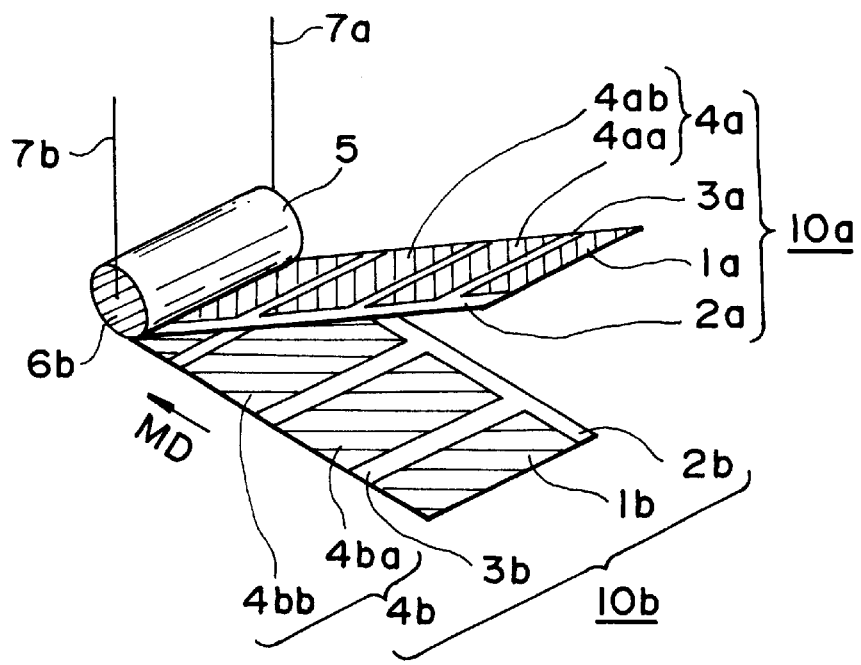
F I G. 1
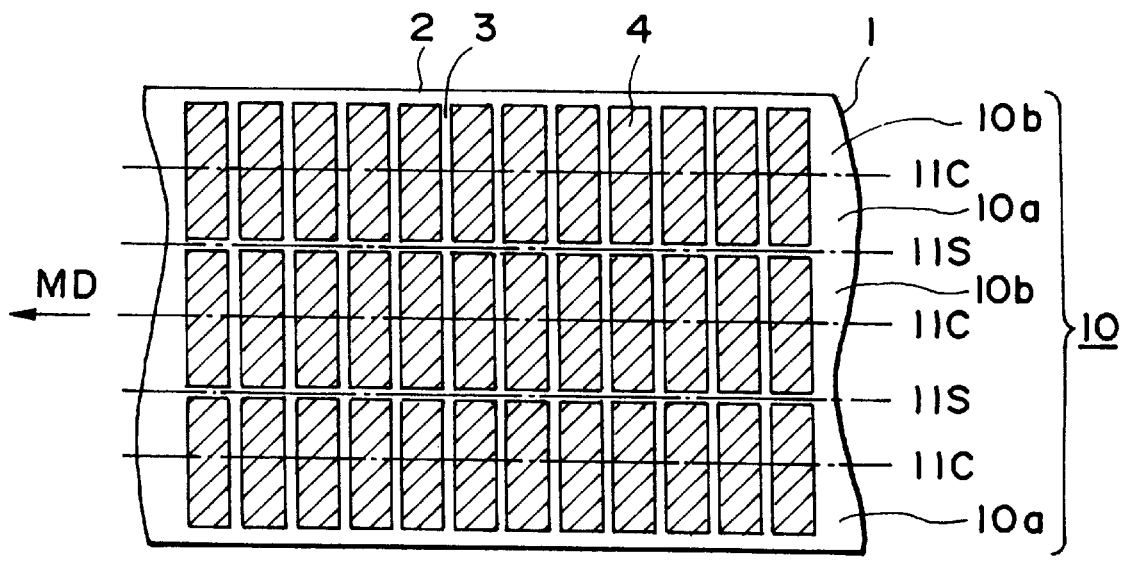
F I G. 2

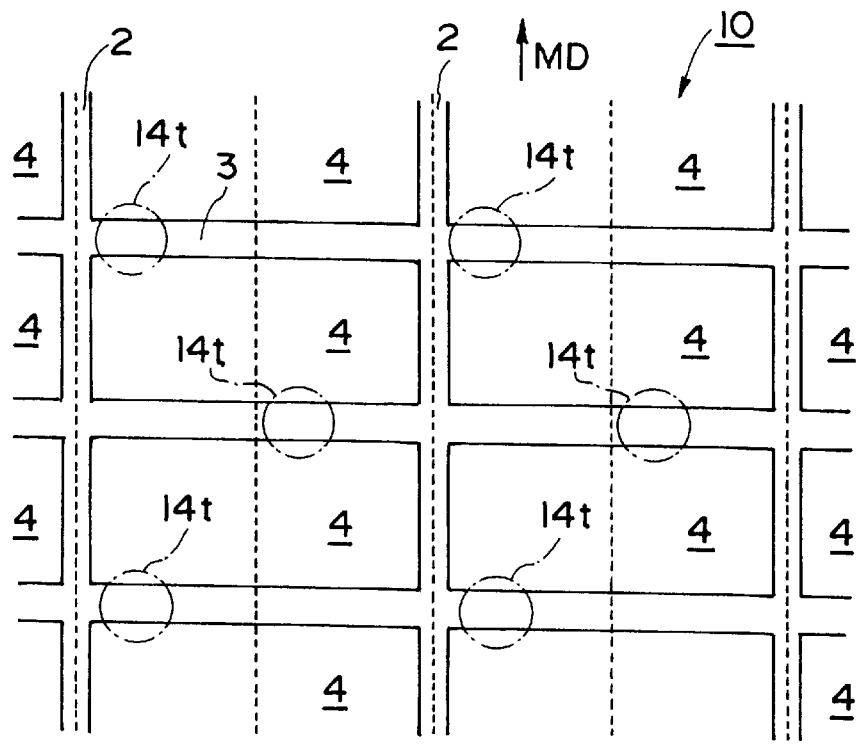
FIG. 5A
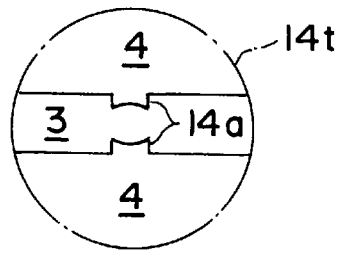  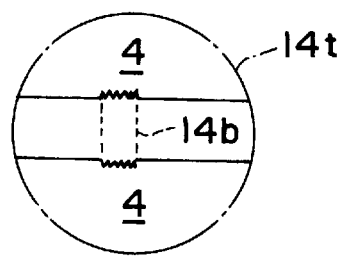
FIG. 5B    FIG. 5C
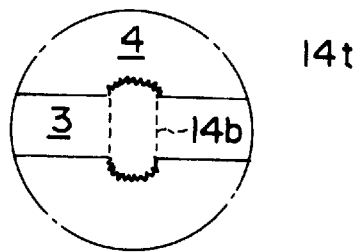
FIG. 5D

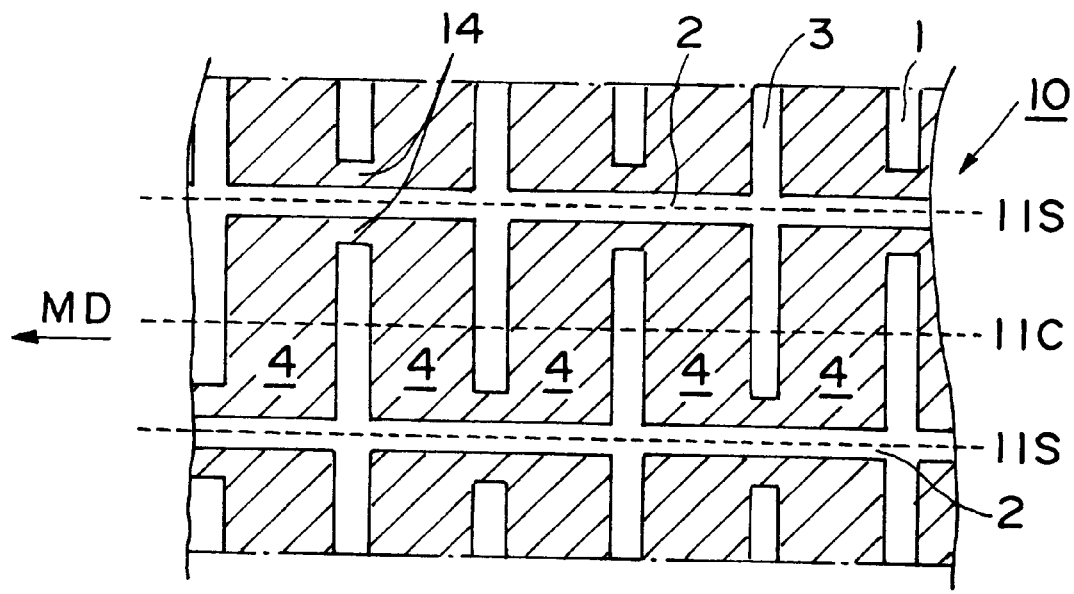
F I G. 9A
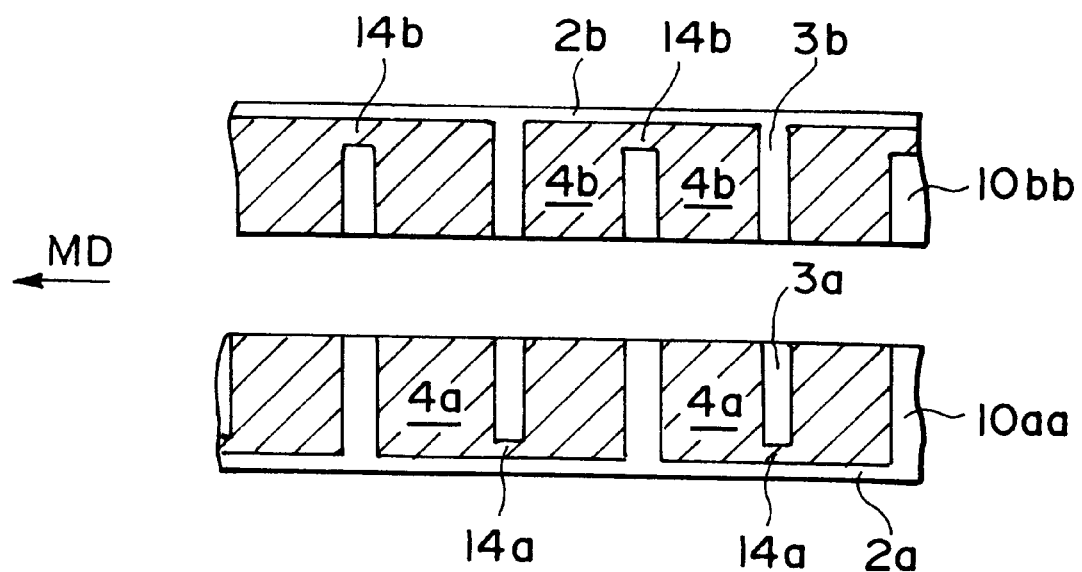
F I G. 9B 11 5,933,947

METALLIZED FILM PROCESS FOR PRODUCTION THEREOF

This application is a continuation of now abandoned application, Ser. No. 08/524,445, filed Sep. 6, 1995.

FIELD OF THE INVENTION AND RELATED ART

The present invention relates to a metallized film suitable for production of a so-called self-protective metallized film capacitor free from combustion or fuming in the event of dielectric breakdown due to excessive voltage stress, etc., a process for production of such a metallized film, and a film capacitor using such a metallized film.

A conventional metallized film capacitor has been prepared by providing two metallized films each comprising a dielectric substrate film strip and a deposited metal layer uniformly formed on the film strip except for a longitudinal margin (non-deposited part) along one longitudinal edge thereof, winding the two metallized films together in lamination so that their longitudinal margins are on opposite sides to each other to form a roll of the metallized film, and forming sprayed metal electrodes on both end surfaces of the roll. In such a conventional metallized film capacitor, it is possible that a self-healing function (i.e., a function of recovering an insulating state after a dielectric film is once broken partly due to a short circuit between opposite electrodes caused by an excessive voltage stress, etc., owing to vaporization of the electrode metal around the point of failure by the short circuit) does not work in some cases and, in such cases, the dielectric breakdown gradually proceeds to the point of failure because the capacitor is entirely formed as a single capacitor, finally resulting in fuming or inflaming.

In order to solve the problem of such a conventional metallized film capacitor, a so-called self-protective metallized film of which an example is shown in FIG. 1 has been developed. In the capacitor, a pair of dielectric film strips 1a and 1b are provided width discrete or island-like deposited metal segments 4a (4aa, 4ab, ... ) and 4b (4ba, 4bb, ... ) formed thereon except for longitudinal side margins 2a and 2b on each one longitudinally extending side thereof and a plurality of transverse margins 3a and 3b on each one surface thereof to form a pair of metallized films 10a and 10b. The metallized films 10a and 10b are wound in the machine direction MD about each other in lamination to form a roll 5. On both end surfaces of the roll 5, sprayed metal electrodes 6a (appearing on the reverse side and not shown in FIG. 1) and 6b are formed and connected with lead wires 7a and 7b (electrically connected to the deposited metal segments 4a and 4b, respectively). As a result, in the laminated and wound state of the metallized films 10a and 10b shown in FIG. 1, for example, there is provided a metallized film capacitor comprising a large number of segment capacitors which are functionally separated from each other in the longitudinal direction, composed of opposite electrode pairs 4ab–4bb, ... , respectively, and wound up in the form of the roll 5. The above-mentioned lamination relationship between the metallized films 10a an 10b may be referred to as a complementary lamination configuration.

In the case where an excessive voltage stress is applied to the metallized film capacitor and an segment capacitor comprising the electrode pair 4aa–4ba, for example, is broken thereby, a short circuit current concentratively flows via the sprayed metal electrodes 6a or 6b through which the electrode pair 4aa–4ba is electrically connected to the other segment capacitors to scatteringly remove the deposited metal layer along the connection. As a result, the segment capacitor comprising 4aa–4ba is electrically isolated from the other segments and the capacitance of the overall capacitor is correspondingly lowered. However, as the broken segment capacitor is electrically isolated from the other segment capacitors, it is possible to obviate the enlargement of the broken part and the accompanying inflaming or combustion of the entire capacitor.

The above-mentioned metallized film strips 10a and 10b may ordinarily be prepared from a larger size-of metallized film strip 10 as shown in FIG. 2 which is provided with discrete or island-like deposited metal segments 4, e.g., by vapor deposition, while leaving longitudinal margins 2 and transverse margins 3. The metallized film strip 10 may be once wound up in a roll, as desired, and then slit along longitudinally extending central slit lines 11C and side slit lines 11S to provide such metallized film strips 10a and 10b. Generally, such a metallized film strip 10 having a fine vapor deposition pattern as shown in FIG. 2 may frequently be prepared through a semi-continuous vacuum evaporation process wherein a rolled stock dielectric film is placed in a vacuum chamber, continuously unwound and subjected to vacuum evaporation of the metal, and then wound up again in the same vacuum chamber. In this case, the thus-formed roll of metallized stock film is taken out of the vacuum chamber and unwound to be slit into metallized film strips 10a and 10b.

In a process for producing metallized films including sequential steps as described, there has been found a difficulty in that winding wrinkles occur frequently at indefinite parts in the metallized film after the vapor deposition when the metallized film is re-wound into the metallized stock film roll. The degree of the wrinkles is more serious when the rolled stock,film is thinner, so that a normal slitting operation may be hindered and result in substantially inferior metallized film strips. This difficulty tends to be alleviated if the process speed during the vacuum deposition is lowered but cannot be completely removed. Further, the lower process speed inevitably results in a lower production efficiency.

SUMMARY OF THE INVENTION

Accordingly, a principal object of the present invention is to provide a metallized film (strip) suitable for production of a self-protective metallized film capacitor and to solve the problem of occurrence of winding wrinkles during the production thereof, a process for producing such a metallized film, and a metallized film capacitor produced from such a metallized film.

As a result of our study, it has been considered that the winding wrinkles in the metallized film is caused during the winding of the metallized film principally because the metallized film comprises a dielectric film substrate on which deposited metal segments are formed discretely, and static electricity generated by running of the film substrate accumulates on respective deposited metal segments and cannot be leaked out. As a result, a potential difference may occur between the metal segments and laminated film sheets can be irregularly attracted to or repulsed by each-other by the static charge to cause the wrinkles during the winding. As a result of our further study, it has been discovered that the above problem of winding wrinkles due to the accumulation of static charge can be solved by ensuring electrical connection between adjacent deposited metal segments up to the steps of formation and winding of a metallized film in a longitudinal direction, and the electrical connection between the deposited metal segments in the longitudinal direction is desirably removed after completion of the vapor deposition step. Further, in order to effect the sequence of ensuring and then removing the electrical connection between the deposited metal segments, it has been found desirable to adopt (1) a process including steps of providing a deposited metal bridge for electrical connection between adjacent deposited metal segments and flowing a current in the longitudinal direction of a metallized film after the formation of the metallized film and preferably before the slitting to cause a concentratively flowing (or short circuit) hot current through the deposited metal bridge to scatteringly vaporize and remove the deposited metal bridge or (2) a process including a slitting step wherein the electrical connection is removed.

According to the present invention based on the above-mentioned discoveries, there is provided a metallized film, comprising: a dielectric film strip and a deposited metal layer formed on a surface of the film strip; said deposited metal layer comprising a plurality of deposited metal segments aligned in a longitudinal direction of the film strip while leaving a comb-shaped margin electrically separating the deposited metal segments and including a longitudinal side margin extending along one longitudinal side of the film strip and a plurality of transverse margins extending laterally across the film strip, and a trace of a metal deposition having provided an electrical connection between an adjacent pair of the deposited metal segments.

According to the present invention, there is also provided a first process for producing a metallized film, comprising:

providing a dielectric film strip, and forming on a surface of the dielectric film strip a plurality of deposited metal segments aligned in a longitudinal direction of the film strip while leaving a longitudinal margin and transverse margins substantially perpendicular to the longitudinal margin, said longitudinal margin and transverse margins electrically separating the deposited metal segments from each other;

wherein the plurality of deposited metal segments are formed first together with a deposited metal bridge electrically connecting adjacent deposited metal segments and then electrically isolated from each other by applying a voltage between the adjacent deposited metal segments to scatteringly remove the deposited metal bridge by a short circuit current passing therethrough, said process optionally including a step of slitting the dielectric film strip in the longitudinal direction at a prescribed lateral pitch, thereby providing a metallized film strip comprising a plurality of deposited metal segments aligned in a longitudinal direction along with a longitudinal side margin on a strip of the dielectric film.

According to the present invention, there is also provided a second process for producing a metallized film, comprising:

providing a metallized stock film strip comprising a dielectric film strip and a plurality of deposited metal segments formed on a surface of the dielectric film strip between at least one pair of longitudinal margins, said plurality of deposited metal segments being generally separated from each other but electrically connected each other with deposited metal bridges each connecting adjacent deposited metal segments, and slitting the metallized stock film strip along a longitudinal line passing through the deposited metal segments and optionally also along a line passing through the longitudinal margins, thereby providing a metallized film strip comprising a longitudinal side margin along one longitudinal edge thereof and a plurality of deposited metal segments which are generally separated from each other in the longitudinal direction of the metallized film strip but reach the other longitudinal edge of the metallized film strip.

According to a further aspect of the present invention, there is provided a film capacitor, comprising: a pair of metallized films alternately wound up into a capacitor roll, and sprayed electrodes formed on both end surfaces of the capacitor roll, wherein at lest one of the pair of metallized films is in the form of a metallized film as described above and another metallized film can comprise a dielectric film having a deposited metal layer uniformly formed one surface thereof. Preferably, the pair of metallized films are each in the form of a metallized film as described above and are wound up in a complementary lamination configuration to form a capacitor roll.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic perspective view for illustrating an outline of a conventional self-protective metallized film capacitor.

FIG. 2 is a partial plan view of a metallized stock film showing a deposited metal segment pattern before slitting for providing a metallized film strip used in the capacitor shown in FIG. 1.

FIG. 5A is a metallized film (after removal of the deposited metal bridges and before slitting), and FIGS. 5B–5D are enlarged partial views for illustrating various forms of traces of deposited metal bridges removed by short-circuiting.

FIG. 9A is an enlarged partial view of a metallized stock film used in an embodiment of the second process for metallized film production according to the present invention, and FIG. 9B is a partial plan view of a pair of product metallized films prepared by slitting the metallized stock film.

DESCRIPTION OF THE PREFERRED EMBODIMENTS

Figure 3A:
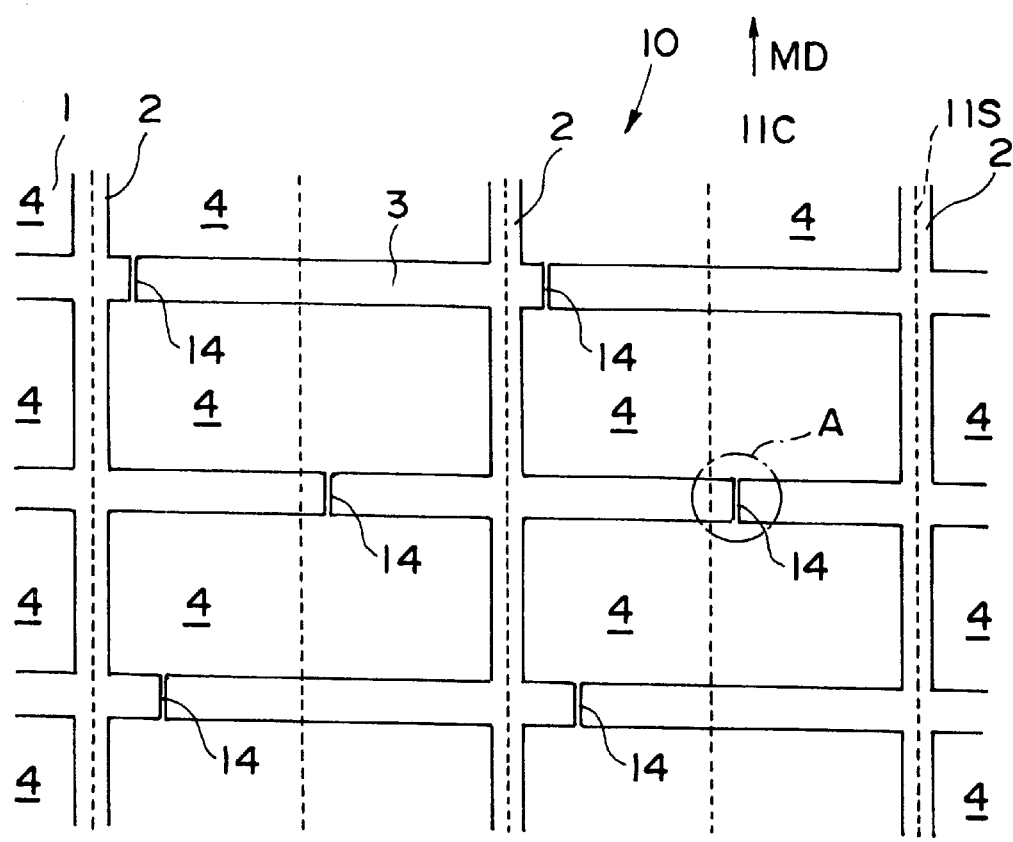
FIG. 3A is a partial plan view of a deposited metal segment pattern on a metallized sock film according to an embodiment of the present invention (before removal of deposited metal bridges and slitting) and FIG. 3B is an enlarged partial view of the deposited metal bridge 14.
Figure 3B:
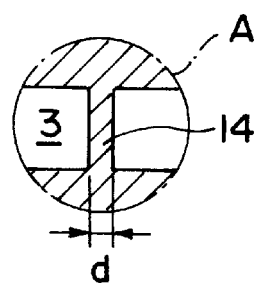

FIG. 3A is an enlarged partial plan view of a metallized film 10 (after vapor deposition) according to an embodiment of the first production process of the present invention, and FIG. 3B is an enlarged view of a portion A (including a deposited metal bridge) in FIG. 3A. In FIGS. 3A and 3B (and subsequent views), members similar to those shown in FIGS. 1 and 2 are denoted by like reference numerals and explanation thereof may be omitted or simplified. Referring to FIGS. 3A and 3B, a metallized film (metallized stock film) 10 comprises a dielectric film strip 1, e.g., in a thickness of ca. 1–12 $\mu$m, such as polyethylene terephthalate film, polypropylene film or polyphenylene sulfide film, and discrete or island-like deposited metal segments 4 (e.g., in the form of rectangles of 5–50 mm×20–100 mm) generally separated from each other and defined by longitudinal margins (portions of the dielectric film 1 not coated with deposited metal) 2 (e.g., in a width of 1.0–5.0 mm) extending in a longitudinal direction MD of the dielectric film strip 1 and transverse or lateral margins 3 (e.g., in a width of 1.0–5.0 mm) extending generally perpendicularly to the longitudinal margins 2. However, the electrical connection in the longitudinal direction of the deposited metal segments 4 is ensured by deposited metal bridges 14 formed in a prescribed width d (FIG. 3B, of, e.g., 0.01–1.0 mm) between longitudinally adjacent deposited metal segments 4.

A metal deposition pattern (including the discrete deposited metal segments 4 and the deposited metal bridges 14) as described above and shown in FIGS. 3A and 3B may be produced through various physical and chemical vapor deposition processes including a vacuum deposition (or evaporation) process as a preferred example. Particularly preferred embodiment thereof may include a process wherein a masking oil for preventing vapor metal deposition (particularly preferred example of which is perfluoroalkylpolyether as disclosed in Japanese Patent Publication (JP-B) 3-55981) is applied in a pattern corresponding to the margins 2 and 3 on the dielectric film strip 1 and the remaining (exposed) part of the film strip 1 is coated with a vapor-deposited metal of, e.g., Al, Zn or Cu, to form the deposited metal segments 4 and deposited metal bridges 14.

Figure 4:
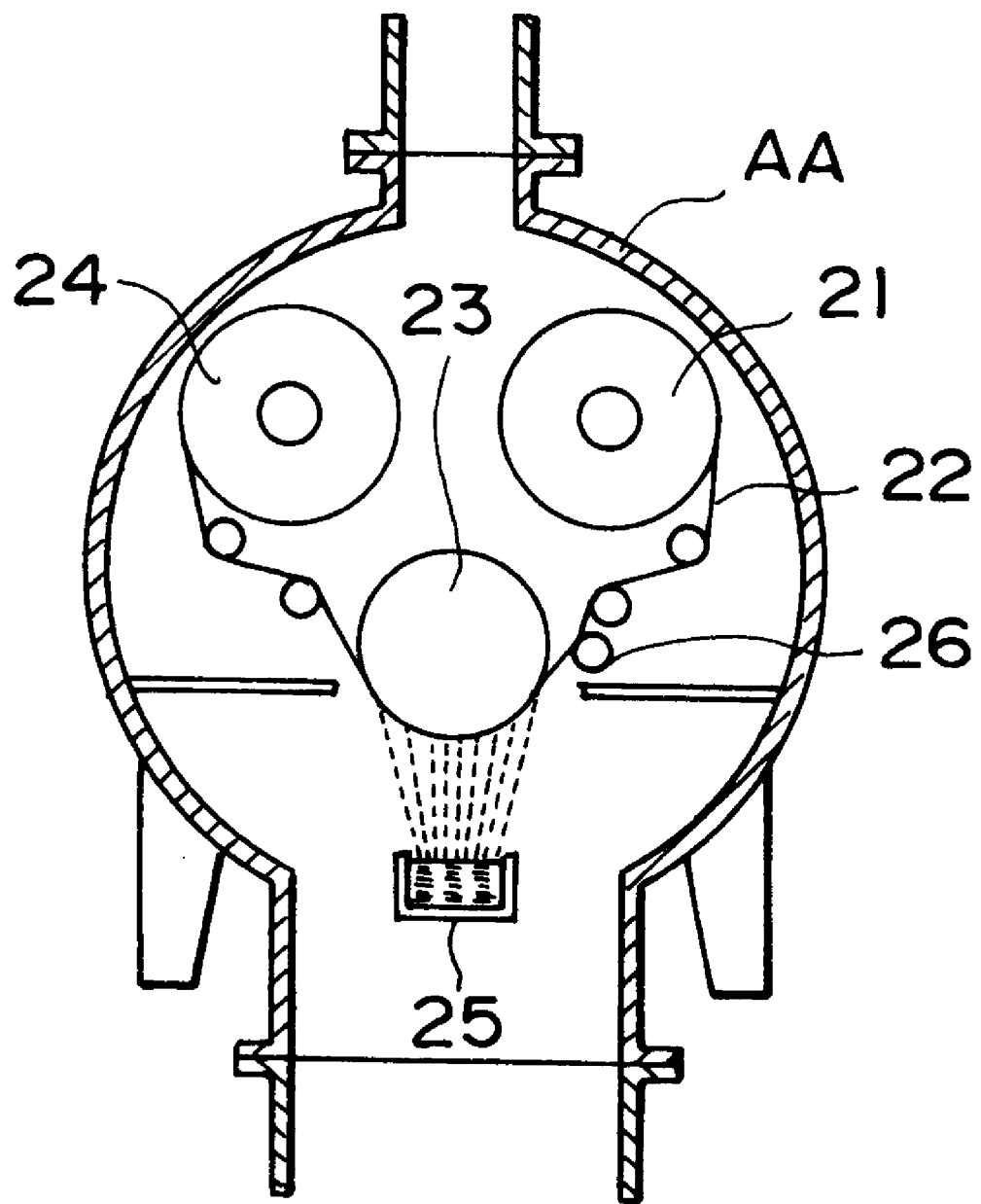
FIG. 4 is a schematic illustration of a semi-continuous vacuum evaporation apparatus for preparing a metallized stock film according to an embodiment of the present invention.

FIG. 4 is a schematic illustration of an apparatus for practicing a semi-continuous vacuum deposition process according to such an oil mask scheme as described above. Referring to FIG. 4, in a vacuum chamber AA, a stock dielectric film 22 (of, e.g., PET (polyethylene terephthalate) supplied by unwinding a stock film roll 21 is conveyed via a cooling can 23 to be wound up into a roll 24. During the conveyance, the film 22 is subjected to application of a masking oil by an oil applicator 26 (e.g., a transfer roller or a patterned spraying nozzle) in a prescribed desired pattern corresponding to the margins 2 and 3 and then deposition of a metal, such as Al, evaporated from an evaporation metal source 25 disposed below the cooling can 23, thereby to form a metallized film 10 having deposited metal segments 4 and deposited metal bridges 14 of, e.g., Al, in a pattern as shown in FIG. 3A.

Then, a metallized film strip 10 obtained in the above-described manner and in a state as shown in FIG. 3A is supplied with a voltage in the longitudinal direction MD to remove the deposited metal bridges 14 by vaporization due to a short circuit hot current passing therethrough. FIG. 5A is a plan view corresponding to FIG. 3A of a metallized film 10 prepared in this manner, and the appearance of the metallized film 10 shown in FIG. 5A cannot be, at a glance, differentiated from that of the metallized film 10 shown in FIG. 2 prepared in a conventional manner. However, when observed carefully through, e.g., a magnifying glass, traces 14t of removed metal bridges are left as shown in FIGS. 5B, 5C and 5D showing three representative modes of such traces as enlarged views. More specifically, FIG. 5B shows traces 14a corresponding to bases of a deposited metal bridge, and FIGS. 5C and 5D show sticking spotty traces 14b (which can be almost unnoticeable in some cases) and roughed corresponding parts of deposited metal segments 4 (FIG. 5C) or further slightly scooped corresponding parts of deposited metal segments 4 (FIG. 5D). Which of these various shapes of traces 14t, e.g., shown in FIGS. 5C–5D actually appears, depends on factors such as manners of the voltage application, etc.

Figure 6:
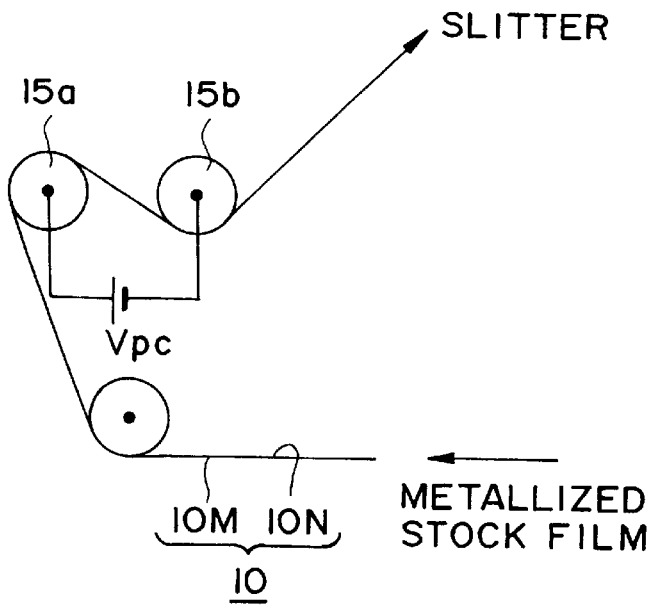
FIG. 6 is a schematic illustration of an apparatus for effecting a deposited metal bridge-removing step and a slitting step in an embodiment of the first process for metallized film production according to the present invention.

According to a preferred embodiment, the above-mentioned voltage for removal of deposited metal bridges 14 may be applied as a part of operation before slitting of a metallized film 10, such as pre-healing (a voltage application treatment for removing insulation defects in the metallized film 10) before the slitting. FIG. 6 illustrates an embodiment thereof wherein, before a metallized film 10 is sent to a slitter for slitting thereof along the central slitting lines 11C and side slitting lines 11S, a DC voltage Vpc applied, e.g., between rollers 15a and 15b for pre-healing, to remove the deposited metal bridges 14 by short circuit current. Incidentally, in the embodiment shown in FIG. 6, the DC voltage Vpc is applied between the roller 15a contacting a metal non-deposited surface 1ON of the metallized film 10 and the roller 15b contacting a metal-deposited surface 10M of the metallized film 10. However, it is also possible to apply such a DC voltage between rollers both contacting the metal-deposited surface 1OM or between rollers both contacting the metal non-deposited surface 10N of the metallized film 10.

As a specific example, in case where a 4 $\mu$m-thick polyethylene terephthalate film was provided with rectangular metallized Al electrode segments 4 of 8 mm×100 mm×0.03 $\mu$m-thickness together with 0.2 mm-wide transverse margins 3 and deposited Al bridges 14 of 0.05 mm-width as shown in FIG. 3A and the resultant metallized film 10 was sent at a rate of 300 m/sec., a DC voltage of 300 volts was applied between rollers 15a and 15b disposed with an axis-axis distance of ca. 41 mm (corresponding to a span of the film 10 of ca. 2 mm between the rollers), whereby the deposited metal bridges 14 could be clearly removed. As a result of observation through a magnifying glass. The traces 14t after the removal of the deposited metal bridges 14 generally showed an appearance as shown in FIG. 5C.

Figure 7:
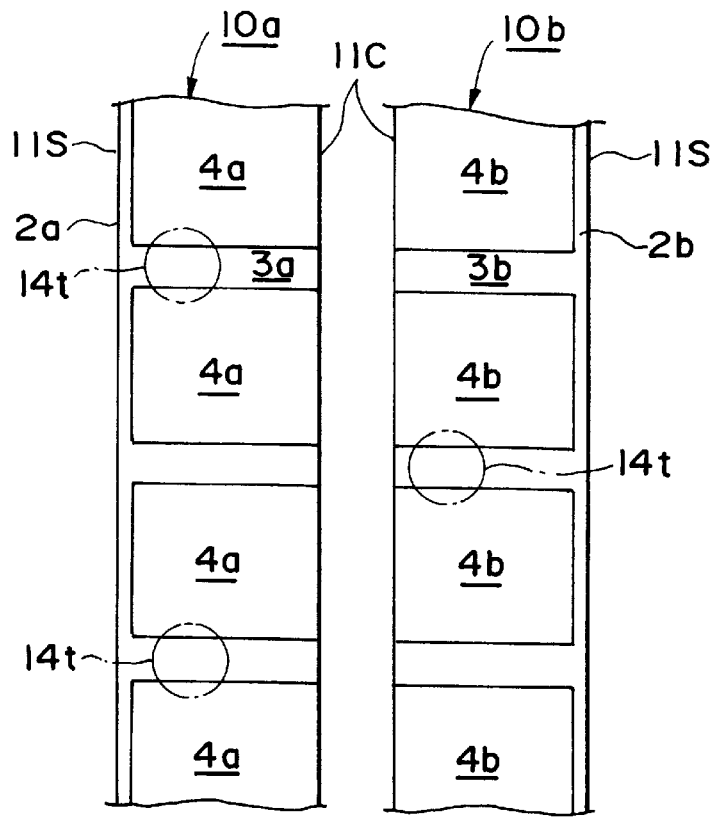
FIG. 7 is a partial plan view of a pair of product metallized films formed by deposited metal bridge-removal and slitting according to an embodiment of the present invention.

Metallized film strips 10a and 10b obtained in the above-described manner after slitting show an appearance as shown in FIG. 7 which is an enlarged partial view corresponding to FIG. 3A. The metallized film strips 10a and 10b shown in FIG. 7 are at a glance similar to the metallized film strips 10a and 10b shown in FIG. 1 but are characterized by the presence of traces 14t after removal by short circuit current of the deposited metal bridges.

A preferred embodiment of metallized film and the first production process therefor has been described with reference to FIGS. 3 to 7 but the above embodiment can be modified in various manners.

Figure 8A:
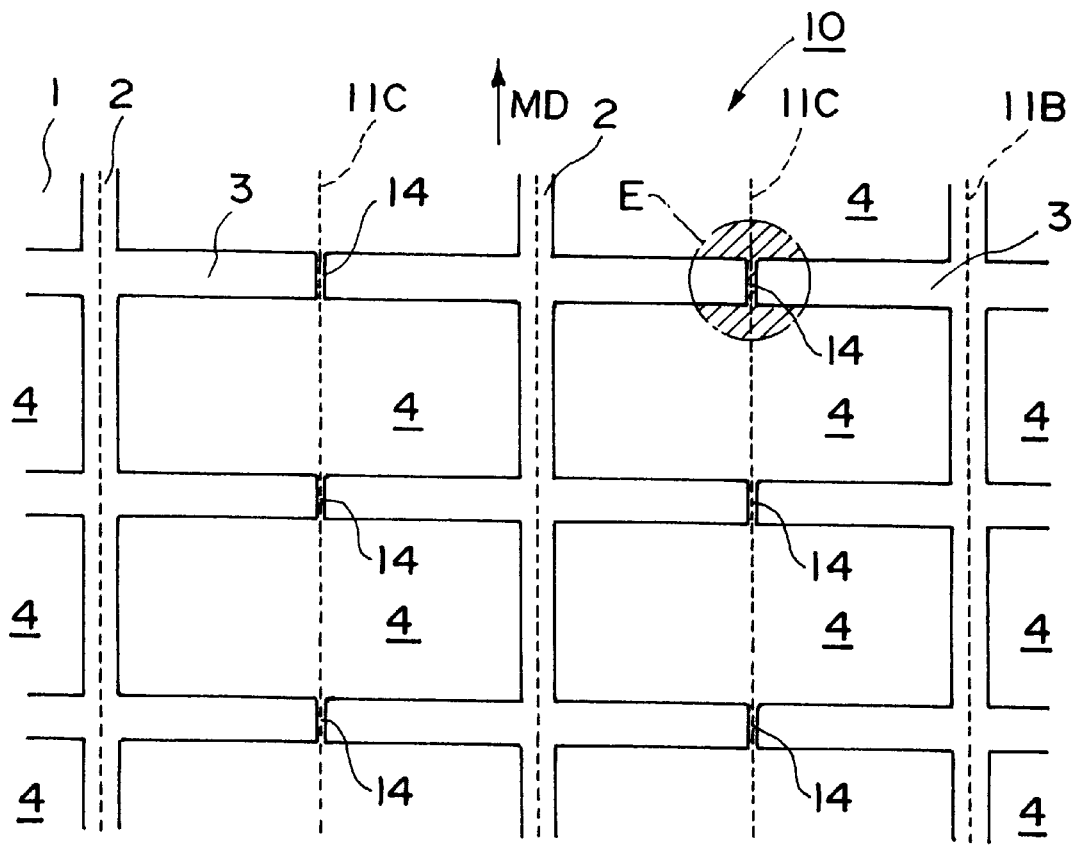
FIG. 8A is a partial plan view of a deposited metal segment pattern on a metallized stock film according to another embodiment of the present invention (before removal of deposited metal bridges and slitting) and FIG. 8B is an enlarged partial view of a deposited metal bridge therein.
Figure 8B:
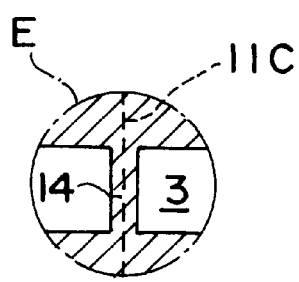

For example, FIG. 8A shows a metal deposition pattern corresponding to the one shown in FIG. 3A of another embodiment of metallized film 10 before slitting (metallized stock film), and FIG. 8B is an enlarged partial view of a part E (a deposited metal bridge 14) in FIG. 8A. In this embodiment, the deposited metal bridges 14 are formed at parts along central slitting lines 11C between adjacent deposited metal segments 4. If the deposited metal bridges 14 are formed at only specific parts between deposited metal segments 4 as in this embodiment, however, a scattered metal from the deposited metal bridges 14 is liable to attach and soil specific parts at the rollers 15a and 15b (particularly the roller 15b contacting the metal-deposited surface) in a bridge-removing apparatus as shown in FIG. 6. Accordingly, it is preferred to adopt a metal deposition pattern wherein deposited metal bridges 14 are formed at laterally random parts between deposited metal segments 4 as shown in FIG. 3. In the embodiments shown in FIGS. 2, 3, 5 and 8, the deposited metal segments are arranged uniformly both longitudinally and laterally, but adjacent longitudinal rows of deposited metal segments can be shifted longitudinally from each other. Further, in the above embodiment, only one deposited metal bridge 14 is disposed between adjacent deposited metal segments but it is also possible to dispose a plurality of deposited metal bridges 14 between adjacent deposited metal segments provided that the total width of the plurality of deposited metal bridges 14 is sufficiently smaller than the width of the deposited metal segments so as to allow a concentration of short circuit current at the deposited metal bridges 14 for removal thereof.

FIG. 9A is an enlarged partial view of a metallized stock film used in an embodiment of the second process for metallized film production according to the present invention, and FIG. 9B is a corresponding enlarged partial view of product metallized film (strips) produced from the metallized stock film.

Referring to FIG. 9A, a metallized stock film 10 comprises a dielectric film strip 1, e.g., in a thickness of ca. 1–12 μm, such as polyethylene terephthalate film, polypropylene film or polyphenylene sulfide film, and on one surface thereof, a plurality of deposited metal segments 4, e.g., roughly in the form of rectangles of 10–50 mm×20–100 mm, disposed almost separated from each other by lateral margins 3 in a width of, e.g., 1.0–5.0 mm but electrically connected to each other with deposited metal bridges 14 in a width of, e.g., 0.05–0.2 mm (disposed alternately at upper and lower parts in a row of deposited metal segments 4) between at least one pair of longitudinal margins 2 of, e.g., 1.0–5.0 mm in width extending in a machine direction MD. In this embodiment, the metallized stock film 10 is slit along central slit lines 11C passing through laterally almost central parts of the deposited metal segments 4 and side slitting lines 11S each passing along a side margin 2 and dividing the side margin 2 into almost equal halves. As a result, pairs of metallized films (metallized film strips) 10a and 10b as products of the second process according to the present invention having mutually almost symmetrical shapes as shown in FIG. 9B.

A metal deposition pattern (including the discrete deposited metal segments 4 and the deposited metal bridges 14) as described above and shown in FIG. 9A may be produced through various physical and chemical vapor deposition processes including a vacuum deposition (or evaporation) process as a preferred example similarly as in the first production process. Similarly, particularly preferred embodiment thereof may include the above-mentioned vacuum deposition (evaporation) process using an apparatus shown in FIG. 4.

The metallized film strips 10aa and 10bb (FIG. 9B) obtained by slitting the above-mentioned metallized stock film 10 according to the second production process of the present invention are different from the metallized film strips 10a and 10b shown in FIG. 1 only in that they include one deposited metal bridge 14 (14a or 14b) for each pair of longitudinally adjacent deposited metal segments 4 (4a or 4b). Accordingly, adjacent segment capacitors formed from a combination of such an adjacent pair of deposited metal segments 4a and 4b are electrically connected but, as a commercial metallized film capacitor is obtained by winding into a roll a pair of long metallized film strips including at least 1000 pairs of such deposited metal segments, the deposited metal electrodes as a whole can be regarded as being separated from each other with a substantially high degree of independence. Accordingly by winding up a pair of metallized film strips 10aa and 10bb as shown in FIG. 9B in the same manner as in FIG. 1, it is possible to obtain a metallized film capacitor having excellent self-protective performance.

The above-described preferred embodiment of the second process for metallized film production can also be modified in various manners.

Particularly, the metal deposition pattern on the dielectric film in the metallized stock film can have a variety of shapes within the characteristic feature of the second production process of the present invention that an electrical connection in the longitudinal direction is ensured before the slitting and an electrical dependence of respective deposited metal segments is provided in the slitting step.

Figure 10:
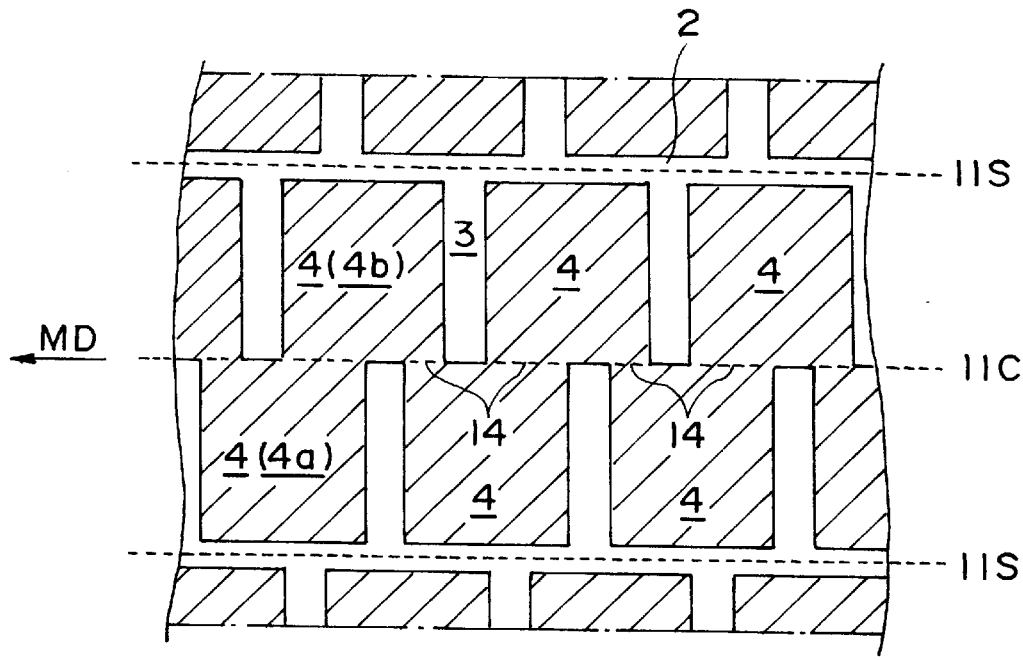
FIGS. 10 and 11 are respectively an enlarged partial view of a metallized stock film according to another embodiment of the second process for metallized film production according to the present invention.

For example, FIG. 10 is an enlarged partial plan view of a metallized stock film having a metal deposition pattern wherein, between a pair of side margins 2, upper and lower deposited metal segments are formed with a longitudinal deviation along a central slitting line 11C, and deposited metal bridges 14 are formed along a joint therebetween (i.e., the central slitting line 11C). By slitting the metallized stock film 10 along the slitting lines 11C and 11S, it is possible to obtain a pair of metallized film strips having deposited metal segment patterns which are at a glance similar to those on the metallized film strips 10a and 10b in FIG. 1.

Figure 11:
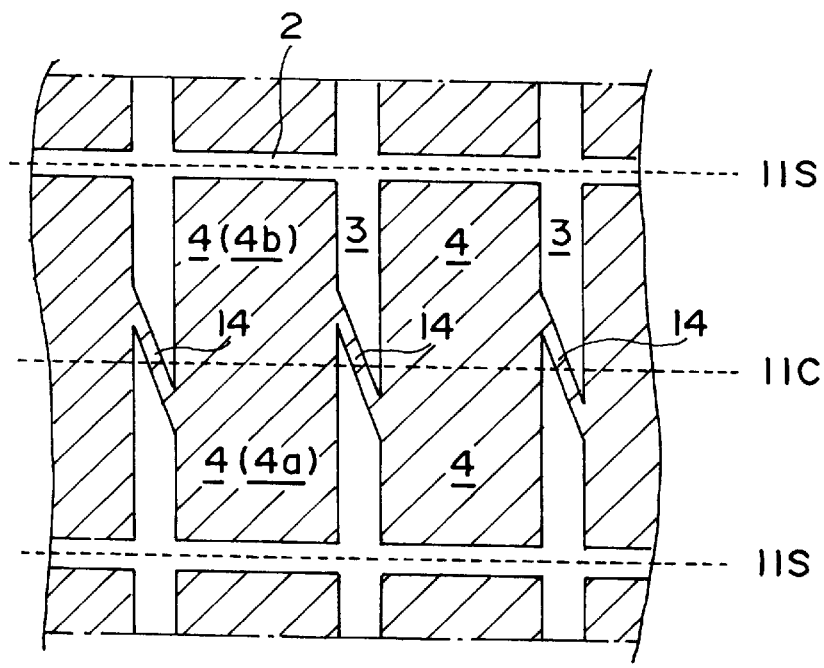

FIG. 11 is an enlarged partial plan view of a metallized stock film wherein rectangular deposited metal segments 4 similar to those in the metallized stock film shown in FIG. 2 are connected with deposited metal bridges 14 each running obliquely at a central part between longitudinally adjacent rectangular deposited metal segments. By slitting the metallized stock film along the slitting lines 11S and along a central slitting line 11C to cut the deposited metal segments 14, thereby removing the electrical connection between the deposited metal segments 4a–4a and between the deposited metal segments 4b–4b a desired metallized film strip can be formed.

The embodiment of the second production process according to the present invention using the metallized stock film shown in FIG. 11 may be referred to as a mode of the process wherein the metallized stock film strip comprises the plurality of deposited metal segments and the deposited metal bridges electrically connecting the deposited metal segments at parts along a central line between the pair of longitudinal margins, and is slit along the central line so as to cut the deposited metal bridges to provide the metallized film strip.

On the other hand, the embodiments of the second production process according to the present invention using the metallized stock films shown in FIGS. 9A and 10 may be inclusively referred to as a mode of the process wherein the metallized stock film strip comprises the plurality of deposited metal segments and the deposited metal bridges electrically connecting the deposited metal segments at alternating parts in the vicinity of the pair of longitudinal margins, and is slit along a longitudinal line passing an almost central part between a lateral width of the deposited metal segments to provide the metallized film strip.

As described above, according to the present invention, a metallized film (strip) having a plurality of deposited metal segments arranged with an electrical isolation from each other and suitable for providing a self-protective metallized film capacitor, can be produced efficiently without causing winding wrinkles or lowering the production speed. A metallized film product and a metallized film capacitor are also provided accordingly.

What is claimed is:

1. A process for producing a metallized film, comprising:

providing a dielectric film strip, and forming on a surface of the dielectric film strip a plurality of deposited metal segments aligned in a longitudinal direction of the film strip while leaving a longitudinal margin and a plurality of transverse margins which are substantially perpendicular to the longitudinal margin, such that said longitudinal margin and said transverse margins electrically separate the deposited metal segments from each other, wherein the plurality of deposited metal segments are initially formed together with deposited metal bridges electrically connecting adjacent deposited metal segments, respectively; and applying a voltage between the adjacent deposited metal segments to vaporize and remove the deposited metal bridges with a short circuit current passing therethrough in order to electrically isolate the adjacent deposited metal segments from each other.

2. A process as claimed in claim 1, further comprising slitting the dielectric film strip in the longitudinal direction at a prescribed lateral pitch, and thereby providing a metallized film strip comprising a plurality of deposited metal segments aligned in a longitudinal direction along with a longitudinal side margin on a strip of the dielectric film.

3. A process as claimed in claim 1, further comprising applying a masking oil at other marginal parts of the dielectric film strip, wherein said plurality of deposited metal segments and said deposited metal bridges, each connecting adjacent deposited metal segments, are formed by vapor deposition of a metal onto the dielectric film strip after the masking oil is applied on the dielectric strip.

* * * * *